United States Patent
Bellefeuille et al.

(10) Patent No.: US 6,168,681 B1
(45) Date of Patent: Jan. 2, 2001

(54) METHOD OF MAKING A FILTER DEVICE

(75) Inventors: Cynthia D. Bellefeuille, Eden Prairie; Andrew J. Dallas; M. E. Wright, both of Apple Valley; Michael A. Madden, Woodbury; Suzan K. Nunnink, Delano, all of MN (US)

(73) Assignee: Donaldson & Company, Inc., Minneapolis, MN (US)

( * ) Notice: Under 35 U.S.C. 154(b), the term of this patent shall be extended for 0 days.

(21) Appl. No.: 09/099,561

(22) Filed: Jun. 18, 1998

Related U.S. Application Data

(62) Division of application No. 08/926,762, filed on Sep. 8, 1997, now Pat. No. 5,869,009, and a continuation of application No. 08/439,825, filed on May 12, 1995, now abandoned.

(51) Int. Cl.$^7$ ...................................... B32B 31/00
(52) U.S. Cl. ................... 156/290; 156/277; 156/308.4
(58) Field of Search .................. 156/290, 276, 156/277, 308.4, 309.6

(56) References Cited

U.S. PATENT DOCUMENTS

| | | |
|---|---|---|
| D. 281,163 | 10/1985 | Robinson . |
| 3,006,346 | 10/1961 | Golding . |
| 3,015,367 | 1/1962 | Smith et al. . |
| 3,413,982 | 12/1968 | Sublett et al. . |
| 3,474,600 | 10/1969 | Tobias . |
| 3,544,507 | 12/1970 | Lloyd . |
| 3,611,678 | 10/1971 | Holden . |
| 3,622,446 | 11/1971 | Burnham . |
| 3,630,007 | 12/1971 | Neumann . |
| 3,721,072 | 3/1973 | Clapham . |
| 3,783,085 | 1/1974 | Pearson et al. . |
| 3,971,373 | 7/1976 | Braun . |
| 4,160,059 | 7/1979 | Samejima . |
| 4,234,326 | 11/1980 | Bailey et al. . |
| 4,296,166 | 10/1981 | Ogino . |
| 4,342,811 | 8/1982 | Lopatin et al. . |
| 4,397,907 | 8/1983 | Rosser et al. . |
| 4,431,542 | 2/1984 | Dingfors et al. . |
| 4,433,024 | 2/1984 | Eian . |
| 4,455,187 | 6/1984 | von Blücher et al. . |
| 4,504,290 | 3/1985 | Pontiu . |
| 4,540,625 | 9/1985 | Sherwood . |
| 4,600,420 | 7/1986 | Wydeven et al. . |
| 4,617,122 | 10/1986 | Kruse et al. . |
| 4,650,506 | 3/1987 | Barris et al. . |
| 4,657,570 | 4/1987 | Gronholz et al. . |
| 4,664,683 | 5/1987 | Degen et al. . |

(List continued on next page.)

FOREIGN PATENT DOCUMENTS

| | | |
|---|---|---|
| 0 090 073 | 10/1983 | (EP) . |
| WO 8502351 | 6/1985 | (WO) . |
| WO 9114496 | 3/1991 | (WO) . |

OTHER PUBLICATIONS

Patent Abstracts of Japan, vol. 009, No. 331 Dec. 25, 1985 & JP,A,60 161712 (Hitachi seisakusho KK), Aug. 23, 1985.
Patent Abstracts of Japan, vol. 95, No. 005, Sep. 29, 1995 & JP,A,07 136435 (Mitsubishi Materials Corp), May 30, 1995.

*Primary Examiner*—Jeff H. Aftergut
(74) *Attorney, Agent, or Firm*—Merchant & Gould

(57) ABSTRACT

A filter device filters contaminants from air for magnetic disk drive systems. The filter has layers of permeable fabric material allowing flow through the filter. An adsorptive slurry is deposited in a discreet pattern onto one layer with a cover layer mounted over the adsorptive deposit. The slurry retains a high adsorptive material surface area for improved adsorption of contaminants. The slurry is placed onto the base material using a screening or other similar application method.

4 Claims, 6 Drawing Sheets

U.S. PATENT DOCUMENTS

| | | |
|---|---|---|
| 4,665,050 | 5/1987 | Degen et al. . |
| 4,749,392 | 6/1988 | Aoki et al. . |
| 4,863,499 | 9/1989 | Osendorf . |
| 5,030,260 | 7/1991 | Beck et al. . |
| 5,124,856 | 6/1992 | Brown et al. . |
| 5,183,546 | 2/1993 | Oren et al. . |
| 5,234,397 | 8/1993 | Wahle et al. . |
| 5,236,595 | 8/1993 | Wang et al. . |
| 5,275,154 | 1/1994 | von Blücher et al. . |
| 5,332,426 | 7/1994 | Tang et al. . |
| 5,336,286 | 8/1994 | Alexander, Jr. et al. . |
| 5,338,340 | 8/1994 | Kasmark, Jr. et al. . |
| 5,350,443 | 9/1994 | von Blücher et al. . |
| 5,538,545 | 7/1996 | Dauber et al. . |
| 5,593,462 | 1/1997 | Dauber et al. . |
| 5,789,154 * | 8/1998 | Durst et al. ............................... 435/6 |

* cited by examiner

METHOD OF MAKING A FILTER DEVICE

This application is a divisional of U.S. application Ser. No. 08/926,762, which was filed on Sep. 8, 1997, and which issued as U.S. Pat. No. 5,869,009 on Feb. 9, 1999. U.S. application Ser. No. 08/926,762 is a continuation of U.S. application Ser. No. 08/439,825 which was filed on May 12, 1995, and which is now abandoned. U.S. application Ser. Nos. 08/926,762 and 08/439,825 are incorporated herein by reference in their entirety.

BACKGROUND OF THE INVENTION

1. Field of the Invention

The present invention relates to a filter device, and in particular to a filter device which is utilized with computer disk drive systems.

2. Description of the Prior Art

Magnetic disk drives which are used in high numbers throughout the computer industry require a clean environment to operate. Contaminants can lead to corrosion and other problems with the components. It has been found that even ambient levels of urban pollution can lead to corrosion which will also lead to failure of the disk drives. To overcome these problems, the systems may be equipped with filter devices which remove particles and corrosive and condensable vaporous contaminants from the system air. Filter devices utilized include breathers, recirculation filters and static pouches.

Hard disk files normally need to be vented to the atmosphere of the surrounding environment to prevent excess pressure building up in the head disk enclosure. During operation, files will heat up and air will flow out of the head disk enclosure. The thermal cycling of the assembly will result in air flow in and out of the enclosure. Organic vapors condense on the surface of the disk causing the head to stick to the surface of the disk (stiction). The new thin film technology utilized in the higher density disks and the high strength to weight metals utilized in the disk file assembly are very susceptible to corrosion as well. Chemical or adsorptive breathers have been developed to provide for removal of the vaporous and gaseous contaminants in addition to removal of particulate contaminants.

As magnetic drives become more and more compact, smaller components are required. Therefore, the size of the filters and especially the thickness of the filters needs to become more and more compact while providing greater protection. The decreased size and the air flow generated by the high speed mechanisms can cause a pressure differential to occur across a breather or recirculation filter. Therefore, it is necessary that the filter device provide adequate flow through the filter to prevent great pressure differential within the drive. If a large pressure difference does develop across a filter, unfiltered leaks will occur within seals, bearings or other moving parts. With recirculation filters, a high differential pressure increases the clean up time of the drive during initial burn in and spin up.

An example of a prior filter device is represented by U.S. Pat. No. 4,657,570 showing an Air Filter Device, assigned to Donaldson Company, Inc., the assignee of the present invention. Although the filter device provides filtering of air in magnetic disk drive systems, the activated carbon portion for adsorption of corrosive gases and potential condensates must be cut and the construction is relatively complicated. Therefore, the device has higher manufacturing costs and requires greater assembly time. In addition, the filtering portion needs to be cut, thereby leading to possible contamination of the filtering device during assembly. In the extremely clean conditions which are needed for the filtering devices, cutting of portions of the filter media can cause contamination and quality control problems.

It can be seen then that new and improved filter devices for disk drive systems are needed. Such devices should provide for filtering air and removing gaseous contaminants from contaminating the disk drive system. In addition, filter devices should have a construction which provides for a very narrow profile with adequate clearance in the disk drive system. Such a device should be inexpensive and easy to manufacture without contamination during the assembly process. The present invention addresses these as well as other problems associated with filter devices for disk drive systems.

SUMMARY OF THE INVENTION

The present invention is directed to a family of filter devices such as are commonly used with magnetic disk drive systems.

According to the present invention, the filter device utilizes a base layer having an adsorptive slurry deposited onto the base in a discrete pattern. The adsorptive slurry is a dispersion of adsorptive material such as an activated carbon or catalytic material for removal of contaminants from the air for the disk drive system. A cover layer is applied over the adsorptive slurry deposit to provide for an area around the deposit for sealing.

The adsorptive slurry can contain other additives for removing various types of contaminants. However, in a preferred embodiment, the slurry does not contain a binder or latex to hold the adsorptive material together. Elimination of the commonly used binder material provides maximum surface area of the adsorptive material for adsorption of the contaminants.

In a preferred method of making the filter device, a rotary screen type device is utilized to apply the adsorptive slurry. In one preferred method, the slurry is deposited onto a rotary screen which engages the base layer. The cohesive strength of the slurry provides for the slurry transferring from the screen to the base layer in a discrete pattern. It can be appreciated that some drying may be required prior to applying the cover layer to help maintain the shape of the deposited adsorptive component. Individual filters are then cut from the resulting composite and the edges sealed. An adhesive portion may be applied to one side of the filter device to provide for mounting to the disk drive system. Various types of filter and support materials can be combined to support and retain the adsorptive deposit which have the properties for the intended use and application.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals designate corresponding elements throughout the several views.

DETAILED DESCRIPTION OF THE PREFERRED EMBODIMENT(S)

Figure 1:
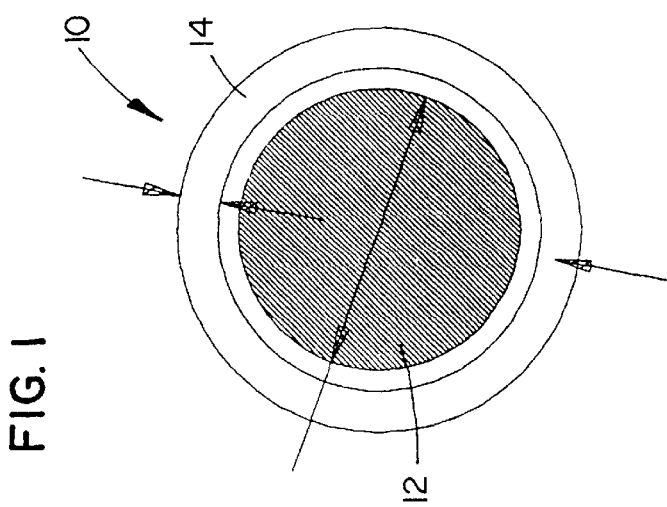
FIG. 1 shows a top plan view of a filter device according to the principles of the present invention.

Referring now to the drawings, wherein like reference numerals designate corresponding structure throughout the views, and referring in particular to FIG. 1, there is shown a filter device, generally designated 10. In a first preferred embodiment, filter device 10 is a breather filter. The filter device 10 includes an active filtering media area 12 surrounded by an outer sealed portion 14.

Figure 3:
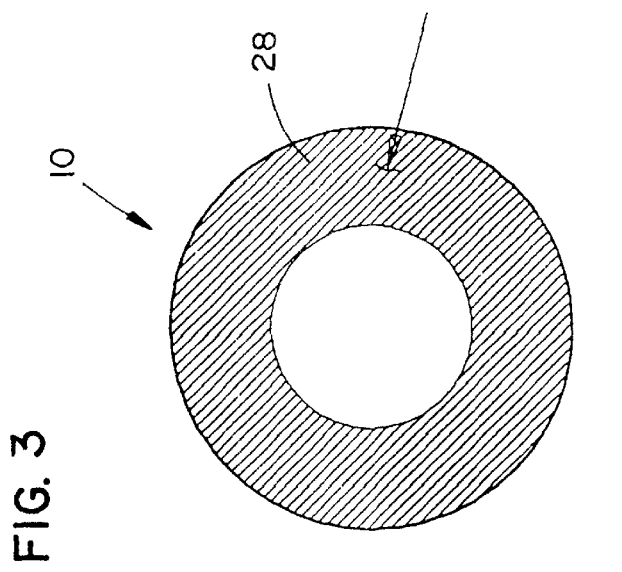
FIG. 3 shows a bottom plan view of the filter device shown in FIG. 1.
Figure 2:
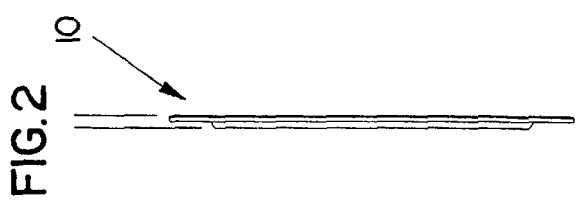
FIG. 2 shows a side elevational view of the filter device shown in FIG. 1.

As shown in FIG. 2, the filter device 10 has an extremely narrow profile. Referring to FIG. 3, the breather filter device 10 includes an annular adhesive layer 28 affixed thereto. The adhesive layer 28 affixes to the filter device and includes a second adhesive side with a peelable paper layer which can be removed for affixing the filter to the appropriate position on the housing for a magnetic disk drive or other apparatus. Although, the filter device 10 is shown as circular, it can be appreciated that other shapes, such as rectangles, ovals or other common shapes may also be used.

Figure 4:
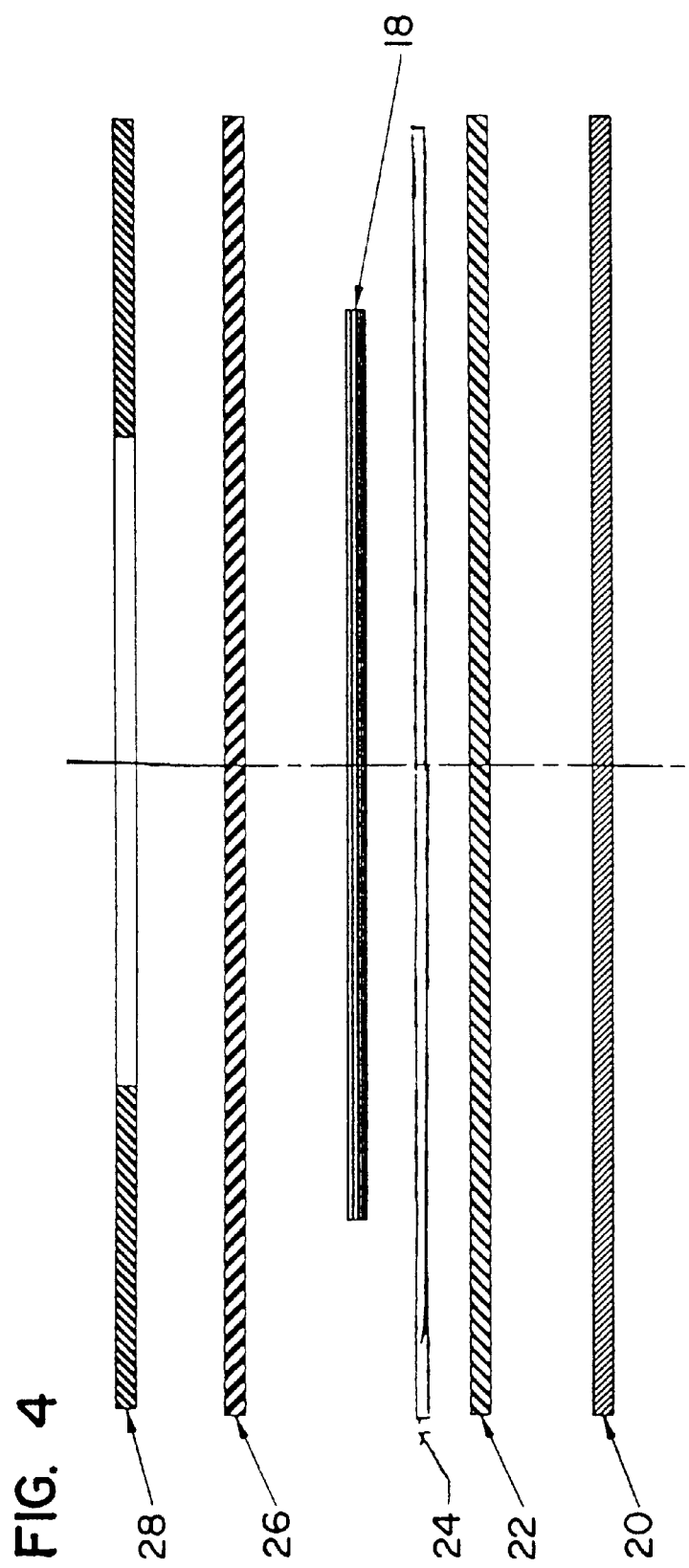
FIG. 4 shows an exploded side elevational view of the breather filter device shown in FIG. 1.
Figure 6:
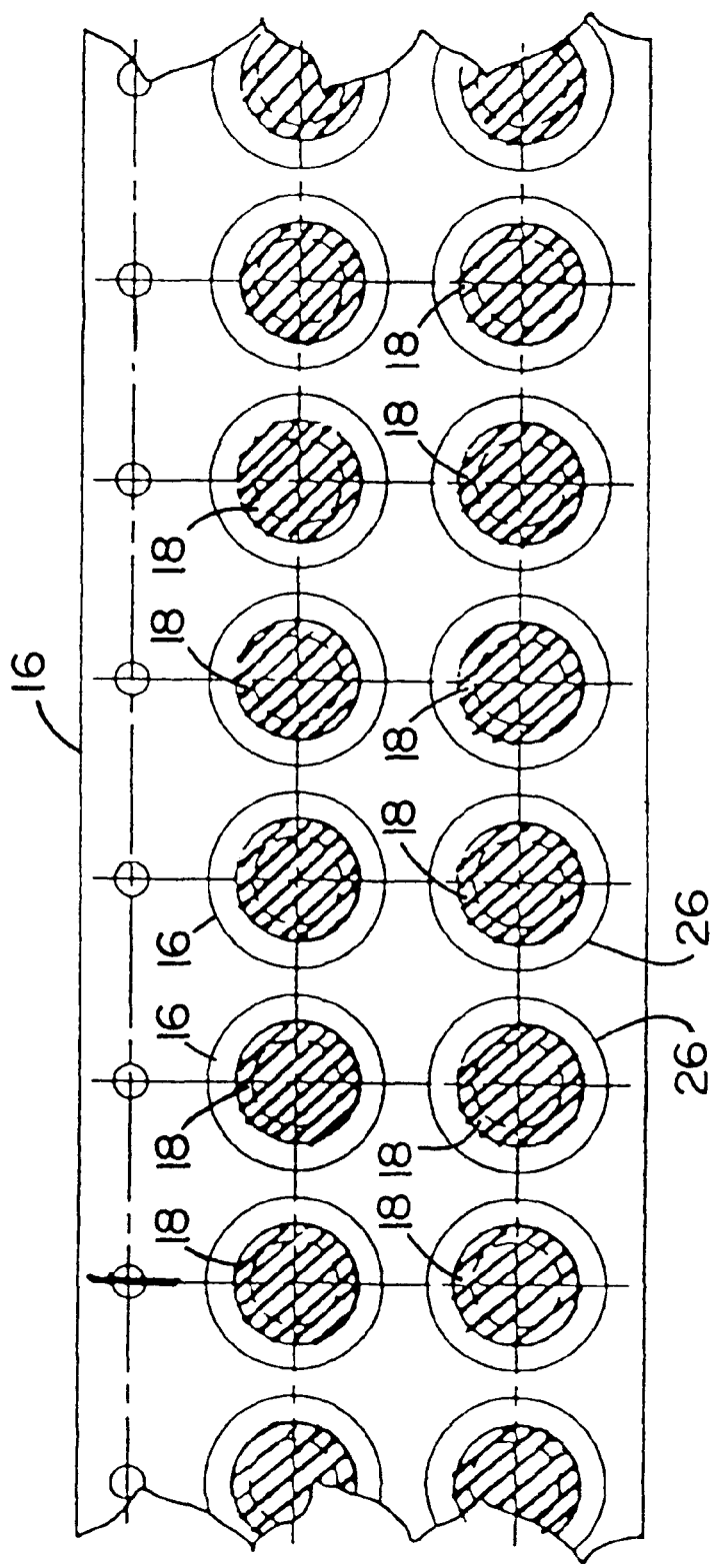
FIG. 6 shows a top plan view of a sheet of material with the adsorptive layer added during manufacturing of the filter device shown in FIG. 1.

Referring now to FIG. 4, there is shown an exploded view of the filter device 10. The filter device 10 includes a number of layers fused or otherwise joined to contain an adsorptive deposit 18 in the active filter media area 12. The adsorptive deposit 18 is normally placed in a discrete pattern on a base material 16 which in a first embodiment includes three layers combined to form the base. In the preferred embodiment, the adsorptive deposit 18 is an adsorptive slurry which is deposited with a screen printing type process, as explained hereinafter. In the embodiment shown, the composite base or base material or base sheet 16 includes a support layer 20 receiving a HEPA or ULPA efficiency membrane 22. Mounted on the membrane layer 22 is an adsorptive material holding layer 24 which receives the adsorptive deposit 18. In the preferred embodiment, the three layers 20, 22 and 24 are joined together in a base sheet 16 prior to deposition of the adsorptive layer 18. It can be appreciated that the discrete deposits of the adsorptive layer 18 may be put on the base sheet 16 in multiple rows, for higher production volume, as shown in FIG. 6. Covering the adsorptive deposit 18 is a cover layer 26 which extends beyond the edges of the adsorptive layer to seal the adsorptive material 18 within the filter device 10. In the preferred embodiment, the support layer 20 is a polymeric open screen or woven material, while the adsorptive material holding layer 24 and cover layer 26 are permeable fabrics, either woven or non-woven materials. The doubled sided adhesive layer 28 is applied to the cover layer. The adhesive layer 28 is annular and preferably has a smaller diameter opening than the diameter of the adsorptive layer 18.

Figure 5:
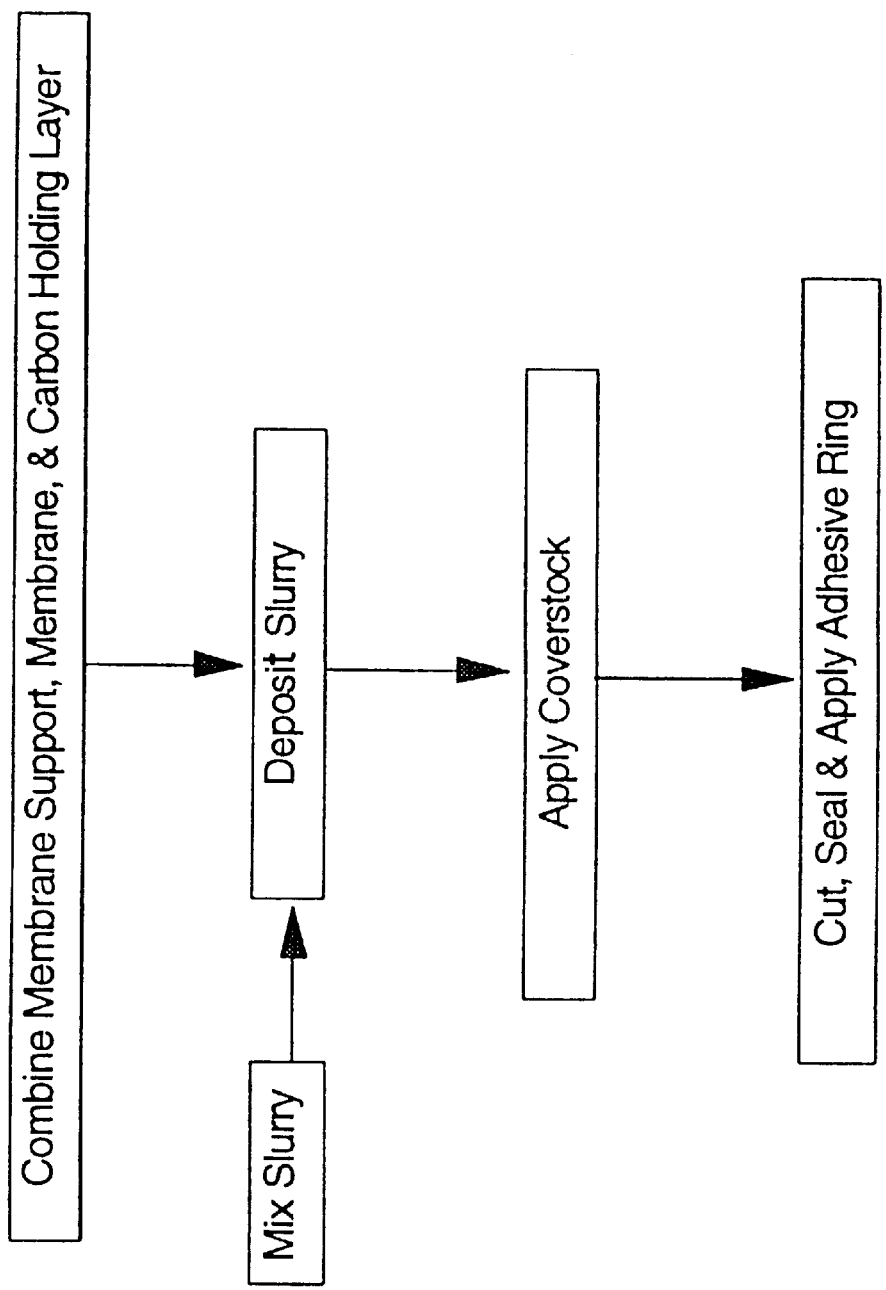
FIG. 5 shows a flow chart of the method of making the filter device shown in FIG. 1.

Referring to FIG. 5, steps for making the filter device are detailed. As explained above, the three layers 20, 22 and 24 are combined to form a base 16. The adsorptive materials 18 are prepared as a slurry for application to the base 16 in a discrete pattern. The slurry is then deposited on the base 16 through a screening or other transfer process. Following drying and application of adhesive to the base and adsorptive layers of the filter for attaching the cover layer 26 to the composite base 16. Individual filter devices 10 are cut from the resulting composite, as shown in FIG. 6. The edges are then welded, thereby sealing the adsorptive material 18 within the filter 10. The annular adhesive layer or ring is then applied and the breather filter device 10 is ready for use.

Figure 7:
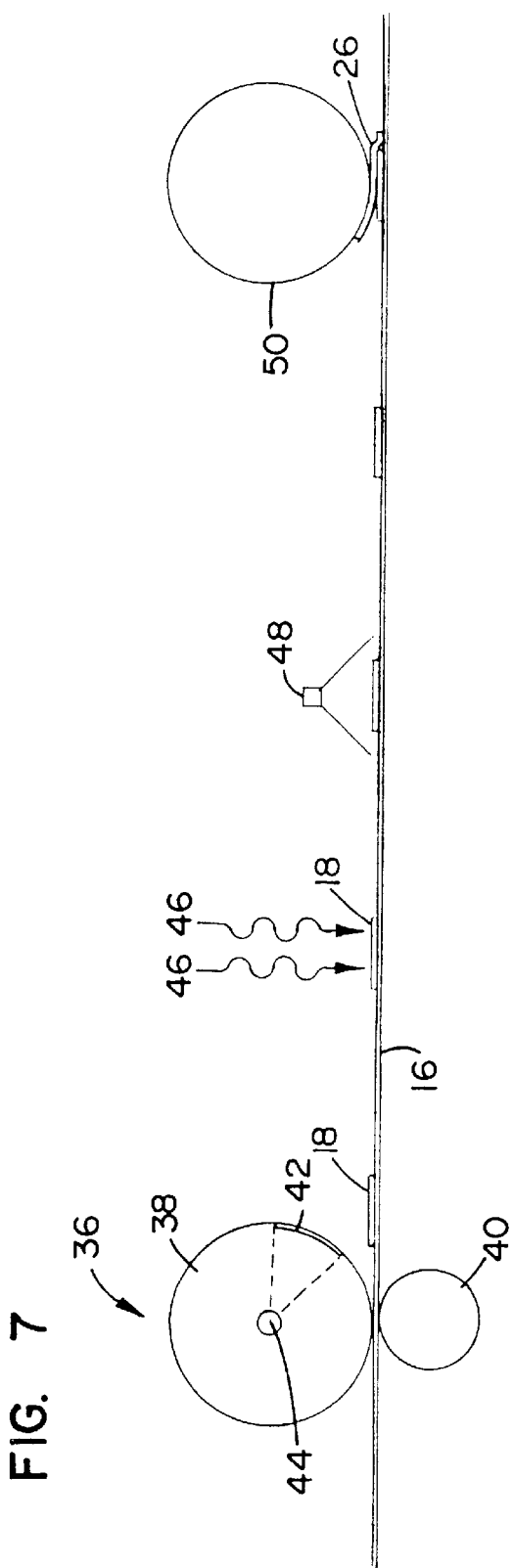
FIG. 7 shows a diagrammatic view of the screening device utilized in making the filter device shown in FIG. 1.

Referring to FIG. 7, the adsorptive layer application steps are shown. In a first method, the adsorptive layer 18 is applied on a rotary type screening apparatus 36. The screening apparatus 36 includes a cylinder 38 and a complementary opposed roller 40. The cylinder 38 includes a screen portion 42 positioned along its periphery. A pump 44 delivers the adsorptive slurry onto the screen 42. The excess is then removed and the screen 42 rotates with the cylinder 38 to engage the base material 16. The adsorptive material may be printed onto either a stationary sheet or a moving web with the rotary screen printing device 36. A desired deposit pattern is created in the screen 42 by any of the processes well known in the industry, such as by using a mass woven screen or acid etching a metal screen. The adsorptive slurry is applied to the back of the screen 42 and pressed into the openings of the screen 42 by a rubber blade, roller or similar device.

As the rotary screen engages the base layer 16, the cohesive strength of the adsorptive layer is such that when the screen 42 is pressed onto the filter base 16, the adsorptive material from the screen 42 transfers to the base 16. The screen mesh and thickness must be sized for the type of adsorptive material 18 and the amount of material which is to be deposited. In the case of an activated carbon adsorptive slurry 18, the weight of the adsorptive layer is 20 to 100 grams per square meter. For example, in a one inch filter, the deposit will have a mass of anywhere between 4 to 20 milligrams per device 10. It can be appreciated that the weight of the adsorptive layer 18 will depend on the density of the adsorptive material which is deposited.

Following deposition of the adsorptive layer 18, the slurry will be wet and may require drying. Therefore, the base 16 having the slurry deposited thereon may be passed through a drying apparatus 46. In addition, following drying, an adhesive sprayer 48 may apply adhesive for applying the cover layer 26. In the preferred embodiment, the edges are sealed with an ultrasonic sealing device 50.

The adsorptive slurry 18 may use several types of active materials including activated carbon, activated alumina, molecular sieves, ion exchange resins or other functional resins and polymers, diatomaceous earths, silica or clays. In addition, the adsorptive materials may be impregnated with other chemicals for selective adsorption. These impregnates include inorganic materials which can be impregnated using either an aqueous or organic solution. A specific choice of the impregnating solution depends on the intended use and application. For example, if acidic ash such as sulphur oxide, or nitrogen oxide, hydrogen sulfide, hydrochloric acid and sulphur based acids are being removed, the carbon can be impregnated with water soluble carbonate, bisulfite, sulfate or hydroxide salts. In addition, low molecular weight or polymeric amines can be used for removal of acid gases and acidic organic vapors such as carboxylic acids, alcohols, and phenols. Organic and inorganic halides such as potassium iodide can be impregnated into the carbon for removal of basic vapors such as N-methypyrrolidone, and other organic amines. The slurry may also be impregnated with sulfate salts for removing ammonia and other low molecular weight amines. If the area is contaminated with aldehydes and ketones, such as formaldehyde and methyl ethyl ketone, the carbon can be impregnated with 2,4 dinitrophenylhydrazine. Catalytic materials may also be added such as copper or nickel, or oxides of manganese, copper or nickel.

The slurry may also have a viscosity modifier, resin or latex added. A viscosity modifier is preferably used to prevent filming of the adsorptive materials. In a preferred embodiment, the slurry does not contain a latex or binder to hold the adsorptive material together, thereby providing maximum adsorptive material surface area for adsorption of the material. In a preferred embodiment, the slurry loses very little of its adsorptive surface area. A preferred embodiment of the slurry will retain more than 80% of the surface area capacity of the active carbon.

Referring now to FIG. 6, there is shown a large sheet of base material 16 having the adsorptive deposits 18 placed thereon. It can be appreciated that the method of the present invention provides a fast method of producing filter devices 10 in large quantities without contamination due to cutting the carbon materials as was done in prior adsorptive devices.

It can be appreciated that the layers of the filter device 10 may be any type of woven or non-woven materials that are sufficiently tight to contain the adsorptive deposit 18. The layers can be a single or multiple ply, depending on the desired properties of the composite. It has been found that particularly useful are fabrics which have appropriate surface densities for the deposition of the adsorptive or catalytic layer. It should be noted that one of the sides of the composite should possess sufficient void volume into which the adsorptive layer can be deposited to maintain the shape of the adsorptive or catalytic layer when nipped between the rollers to ensure contact of the adhesive and the fabric layers.

An example of one preferred embodiment of the filter device includes an adsorptive slurry having a composition of 7 grams of viscosity modifier xanthum gum which is wetted with isopropyl alcohol. This is mixed with 20 grams of potassium carbonate and 653 grams of water. 320 grams of PCB-G activated carbon, which can be obtained from Calgon Corporation, is added to the thickened solution. Following mixture of the solution, the slurry is ready for application. The adsorptive slurry has the following adsorption capacity and surface area characteristics.

TABLE 1

| Typical Equilibrium Adsorption Capacity | |
|---|---|
| Toluene | 4.4 mgs |
| $H_2S$ | 3.4 mgs |
| $Cl_2$ | 8.7 mgs |
| HCl | 1.6 mgs |
| $NO_x$ | 4.0 mgs |

TABLE 2

| Brunauer Emmett Teller (BET) Surface Area | |
|---|---|
| PCB-G Carbon | 968 $m^2$/gms |
| Slurry | 841 $m^2$/gms |

In the embodiment described, the slurry is pumped to the interior of the rotary screen with a repetitive circular patter of 0.7 inches. The deposition of 13 milligrams±4 milligrams dry weight of slurry is printed on either a base of polyethylene or similar hydrophobic or non-wicking web having a Frazier air permeability of at least 4 cubic feet per minute per square foot at one-half inch water pressure drop, as measured on a Frazier permeability tester. In addition, other permeable non-woven materials, such as a spun bonded polyester non-woven which is laminated to a membrane, may be used. A fine screen is typically used for proper distribution of PCB-G activated carbon. The resulting filter device 10 will typically have a one inch diameter with the adsorptive capacity as stated above.

Many prior art filters have low Frazier permeabilities, in the neighborhood of 0.1 cubic feet per minute per square foot, which causes a large pressure drop across the filter. The permeability of the filters 10 of the present invention are much higher, typically having Frazier permeabilities in the range of 0.3 to 0.57 cubic feet per minute per square foot. Therefore, the present invention experiences a much smaller pressure drop and avoids the problems of the prior art, while maintaining high adsorptive capacity.

Figure 8:
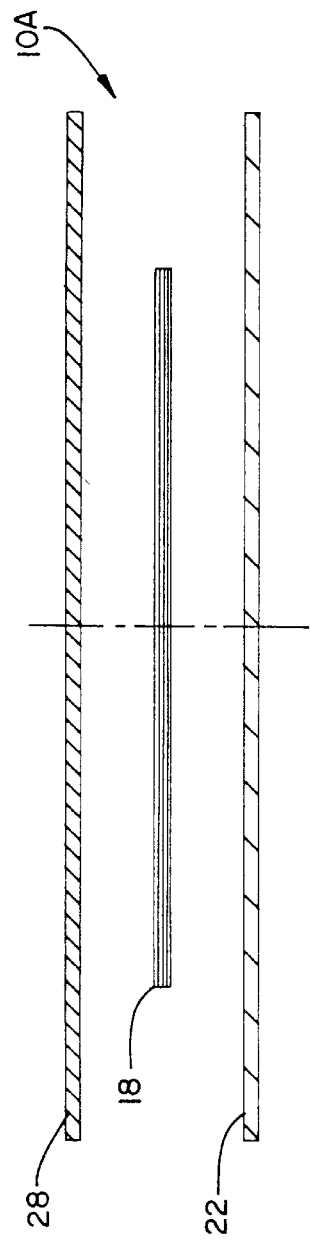
FIG. 8 shows an exploded side elevational view of a second embodiment of a filter device according to the principles of the present invention.

Referring now to FIG. 8, there is shown a second embodiment of the filter device showing an adsorbent pouch configuration, generally designated 10A. The absorbent pouch filter 10A is mounted onto an interior surface of the magnetic disk drive system or other system to generally filter contaminants and remove corrosive elements. In the absorbent pouch filter 10A, an adsorptive deposit layer 18 is placed on a base layer 22 which is preferably a hydrophobic permeable membrane. An adhesive layer 28 is applied over the adsorptive layer 18. The adhesive layer 28 and the membrane layer 22 seal around and retain the adsorptive layer 18. The adhesive layer 28 affixes to an interior of the magnetic disk drive or other system by removing a peelable paper layer. As the air circulates throughout the interior of the magnetic disk drive or other system, the adsorbent pouch filter 10A removes contaminants.

Figure 9:
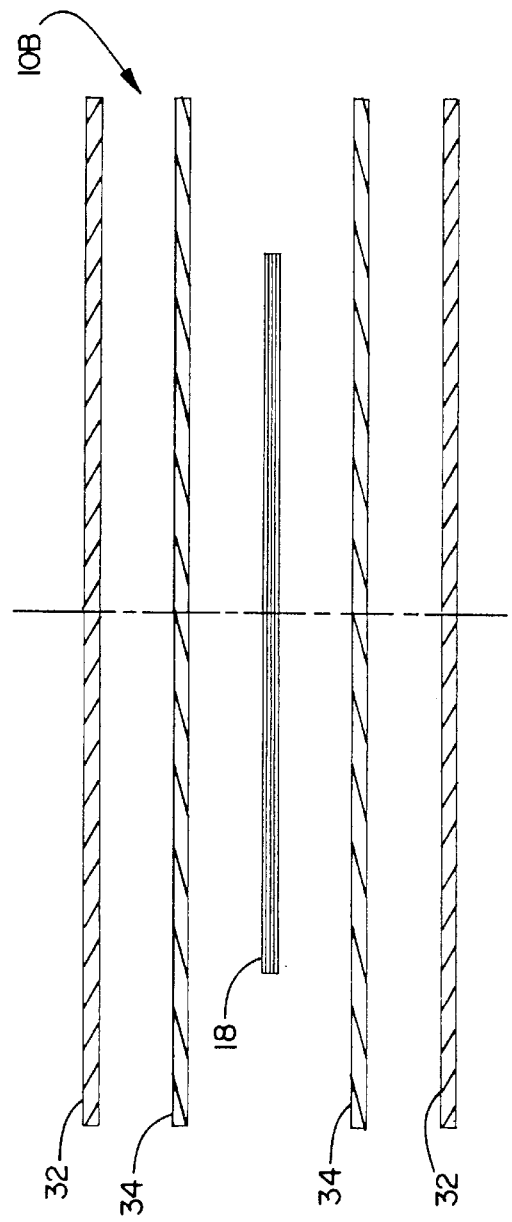
FIG. 9 shows an exploded side elevational view of a third embodiment of a filter device according to the principles of the present invention.

Referring now to FIG. 9, there is shown a third embodiment of a filter device according to the principles of the present invention, generally designated 10B. The filter device 10B is a recirculation type filter for filtering the air as it is recirculated through the magnetic disk drive or other system. The recirculation filter 10B includes an adsorptive layer 18. The adsorptive slurry 18 is deposited onto a base layer 34 which is similar to the base layer 16 for the breather filter device shown in FIG. 4. However, for a recirculation filter 10B, a pair of base layers 34 sandwich the adsorptive layer 18. In addition, cover layers 32 are attached over the base layers 34. The cover layers 32 may be woven polyester or other material which provides satisfactory permeability. It can be appreciated that with this arrangement, airflow can pass through the recirculation filter 10B in either direction without a pressure build up on either side.

It can be appreciated that the various embodiments of the filter including breather filter 10, adsorbent pouch filter 10A and recirculation filter 10B may be combined in various combinations for removal of contaminants or used individually. For example, the breather filter may be used with an adsorbent pouch and/or recirculation filter. Likewise, the others may be combined for multiple filtering configurations depending on the filtering needs of the system.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of making a filter, the method comprising steps of:
   (a) providing a base layer including a support layer, an efficiency membrane, and an adsorptive material holding layer, wherein the adsorptive material holding layer includes an adsorptive material receiving surface;
   (b) depositing an adsorptive material through a screen member onto the adsorptive material receiving surface of the adsorptive material holding layer;
   (c) applying a cover layer comprising a permeable fabric over the adsorptive layer, and welding the cover layer to the adsorptive material holding layer; and
   (d) drying the adsorptive material.

2. A method according to claim 1, wherein the screen member comprises a screen and the slurry is applied to a back portion of the screen and pressed onto the adsorptive material holding layer.

3. A method according to claim 2, wherein the slurry is pressed into openings in the screen by a blade or roller.

4. A method according to claim 2 wherein the slurry is pressed into openings in the screen by a roller, wherein the roller comprises a screen portion, and wherein the slurry is delivered through the screen to the adsorptive material holding layer.

* * * * *